INVENTOR
Edmund J. Lomazzo
BY Johnson and Kline
ATTORNEYS

Aug. 25, 1959    E. J. LOMAZZO    2,900,860
MECHANISM FOR PERFORMING MACHINING OPERATIONS
Filed May 7, 1953    4 Sheets-Sheet 2

INVENTOR
Edmund J. Lomazzo
BY
Johnson and Kline
ATTORNEYS

Aug. 25, 1959 E. J. LOMAZZO 2,900,860
MECHANISM FOR PERFORMING MACHINING OPERATIONS
Filed May 7, 1953 4 Sheets-Sheet 3

INVENTOR
Edmund J. Lomazzo

BY Johnson and Kline
ATTORNEYS

Aug. 25, 1959 E. J. LOMAZZO 2,900,860
MECHANISM FOR PERFORMING MACHINING OPERATIONS
Filed May 7, 1953 4 Sheets-Sheet 4

INVENTOR
Edmund J. Lomazzo
BY Johnson and Kline
ATTORNEYS

United States Patent Office 2,900,860
Patented Aug. 25, 1959

2,900,860

MECHANISM FOR PERFORMING MACHINING OPERATIONS

Edmund J. Lomazzo, Detroit, Mich., assignor, by mesne assignments, to The Bullard Company, Bridgeport, Conn., a corporation of Connecticut Application May 7, 1953, Serial No. 353,512

1 Claim. (Cl. 82—24)

This invention relates to lathe tool-carriage mechanisms.

An object of this invention is to provide a lathe with a carriage mechanism for a work-facing tool which is mounted on the rear side of the lathe leaving the front of the lathe open to facilitate the mounting and removal of the work from the spindle. To this end the tool carriage is so constructed and arranged that the tool may operate on the rear or far side of the work. The carriage is movable to the rear away from the work, thus further facilitating the free access from the front of the machine to the chuck or other work-securing means on the spindle. This is particularly advantageous in connection with heavy work, for it permits the work to be brought to and removed from the lathe by a crane or other work-handling mechanism.

According to the present invention, to machine the face of a piece of work chucked on the spindle of a lathe, the tool and its carrier are moved from the rear side of the lathe forwardly toward the axis of the spindle to a determinate position. The tool is then moved toward the face of the work into machining position. While the tool is held in machining position, it and its carrier are moved radially rearwardly toward the periphery of the work and in so doing faces or otherwise machines the work. The rearward movement of the tool and its carrier is interrupted when the machining operation has been completed, and then the tool is moved away from the face of the work and clear of the work. When greater access to the work and the chuck is desired, after the tool has been moved away from and clear of the work, the tool and its carrier are moved rearwardly beyond the work, thereby providing clear passage for the work in being moved axially of the spindle into and out of chucking position.

The method of operating the tool and its carrier above described may be carried out by hand operations or the steps may be carried out by motive power initiated by hand operations. However, to facilitate rapid production of work, it is preferable that the steps be carried out by motive power with the first step, i.e. the step of moving the tool and its carrier from its rearmost position toward the axis of the spindle, being initiated by manual operation and the succeeding steps being initiated automatically seriatim by the completion of the next preceding step.

Another object of the present invention is to provide improved mechanism for operating the tool carriage of a lathe which is rugged in construction and reliable in operation and which is particularly adapted for use in cutting or facing material from the inside out.

In performing work on a lathe, it is frequently desired to cut away and face the bottom of a recess formed within a peripheral flange. With the conventional toolholder and carriage, this requires considerable manipulation of the transverse and longitudinal slides.

A feature of the present invention is the provision of a toolholder in which the movements of the tool are automatically and predeterminately controlled so that pieces may be produced by mass production methods and at greatly increased speeds.

For this purpose, the present invention provides a primary tool carrier which is movable automatically across the piece of the work held in a suitable chuck and for a predetermined distance controlled by limiting mechanism and a secondary tool carrier mounted on the primary carrier and movable at right angles thereto automatically toward and from the work according to a predetermined plan of sequence.

Other features and advantages will hereinafter appear.

In the accompanying drawings which show one form of the present invention, that at present preferred—

Figure 1:
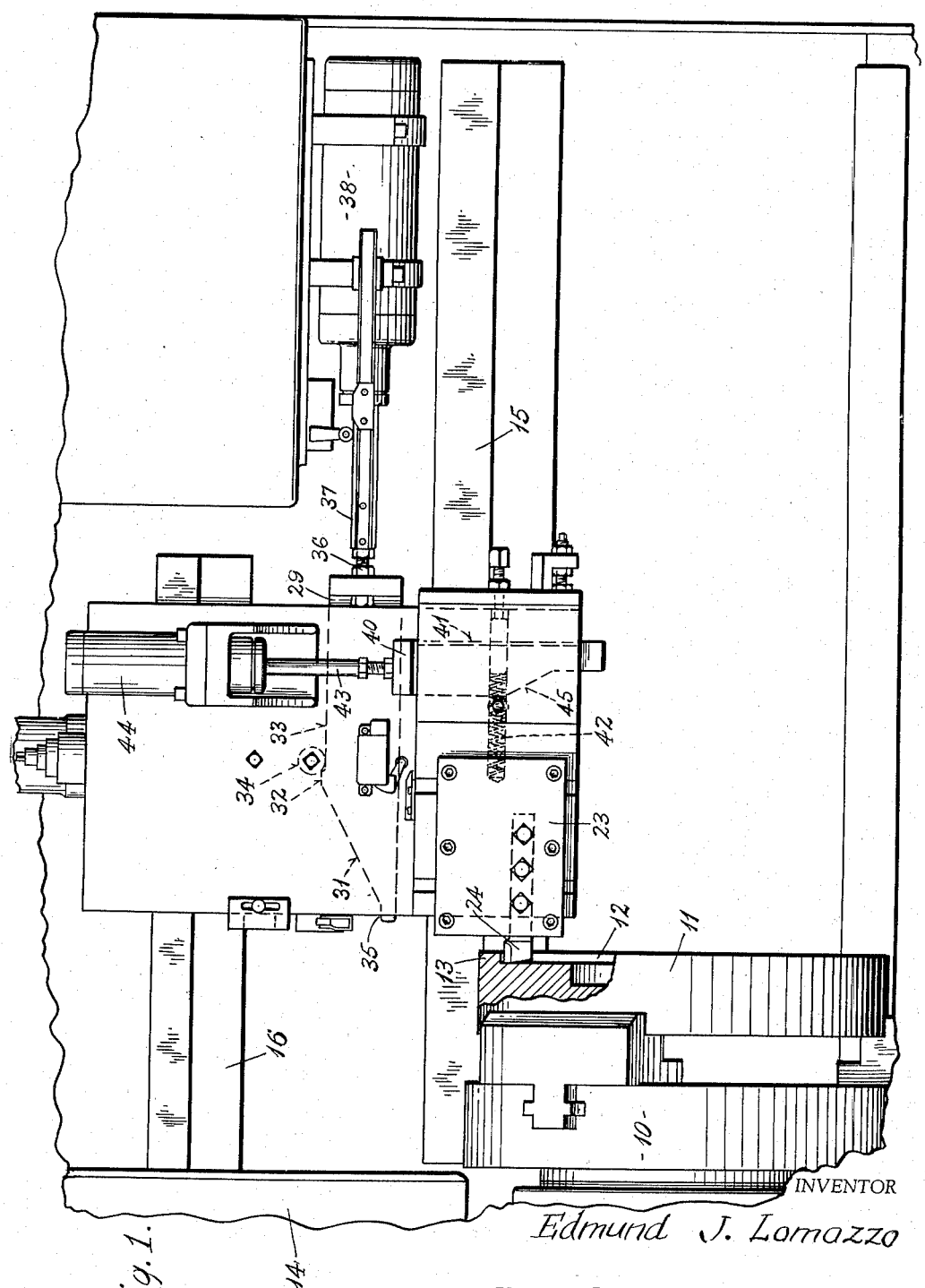
Figure 1 is a plan view showing the carriage mechanism of the present invention—the tool being in operative position in which it has just completed facing a recess in the end of the work.

As shown in Fig. 1, the spindle of the lathe has a chuck 10 for holding a workpiece, the latter being, in the example illustrated, in the form of a disk 11 which is provided with an undercut or recess portion 12 and a projecting flange 13. The bed 14 of the lathe is provided with a front rail 14a, an intermediate rail 15 and a rear rail 16. The tool carriage 17 is mounted on the rails 15 and 16 and along which it may be moved and adjustably secured, more or less depending upon the size and position of the piece to be worked upon.

The carriage 17 is provided with a slot 18 to receive the dovetail base of a primary tool carrier 19 forming part of a compound slide 20 which is movable on the carriage in a horizontal plane toward and from the axis of the spindle. The carrier 19 has a dovetail rail 21 extending at right angles to the dovetail slot 18 for guiding the movement of a secondary tool carrier 22 which thus moves (as shown) in a direction parallel to the axis of the spindle. Mounted on the secondary carriage for the usual adjustable movements needed to set up the tool is a toolholder 23 to which may be secured a tool such as the tool 24 shown in Fig. 1.

Figure 2:
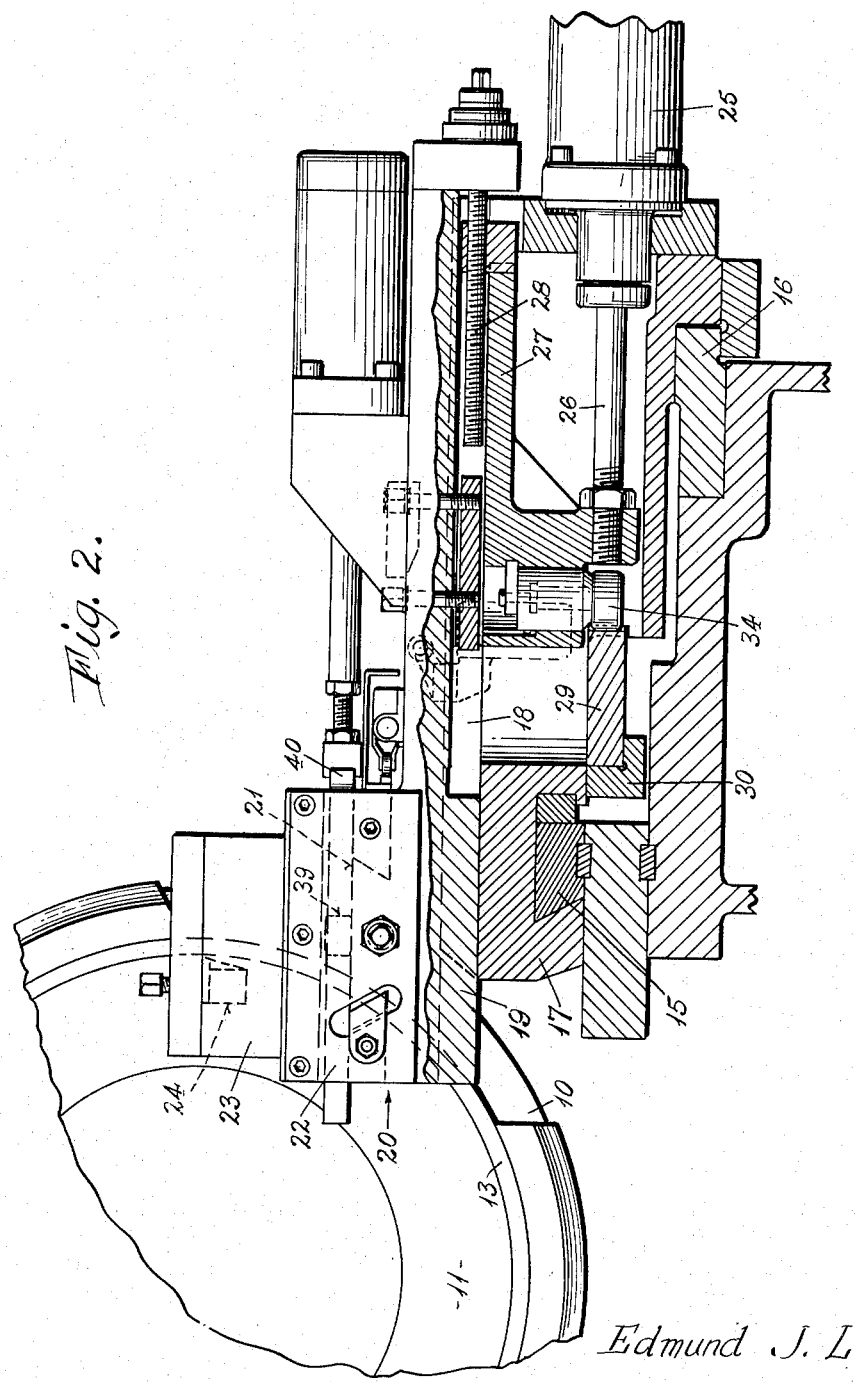
Fig. 2 is an end view, partly in section, of the carriage mechanism of the present invention.

The primary tool carrier 19 and the secondary carrier 22 as shown are controlled in their movements by hydraulic means, the latter being controlled by electromagnetic valves and limit switches. To move the primary carrier 19 forwardly, that is to say, with the tool in its closest position toward the center or axis of the spindle and rearwardly therefrom, the present invention provides a cylinder 25 having a piston rod 26 connected to a bracket 27 which in turn is connected to the carrier 19 by an adjustable screw 28. When the cylinder 25 is acted upon by hydraulic pressure on one side of the piston, the carrier 19 is moved as far to the left (as shown in Fig. 2) as it may, and this, for purposes of explanation, may be considered the first step in the operation of the tool and its carriers.

To move the carrier 19 in the opposite or operating direction, the present invention provides a cam bar 29 which is backed up on its forward side by a rail 30 secured to the carriage 17. On its rearward side the cam bar 29 has a cam surface 31, a drop 32, and a plane surface 33. These surfaces are engaged by a roller 34 carried by the front end of the bracket 27.

When the carrier 19 is in its forward position, the roller 34 rests on the flat 35 of the cam 29 and as the cam plate is moved to the left as seen in Fig. 1, the roller and the carrier 19 will be moved rearwardly, thus causing the tool 24 to be moved outwardly and remove metal in its path. The cam bar 29 has an adjustable connection 36 to a piston rod 37 of a cylinder 38 so that operation of the piston causes the movement of the cam plate to the left and the movement of the carrier 19 to the rear.

During the rearward movement of the carrier 19 the roller 34 is held in firm contact with the cam 29 by continued pressure in the cylinder 25 thus avoiding chattering of the tool.

To move the tool 24 in a direction parallel to the axis of the spindle and against the work, the secondary carriage 22 is provided with a roller 39 which is engaged by a cam bar 40 slidable in ways 41 in the carrier 19.

The secondary carrier 22 is urged to the right as seen in Fig. 1 by a coil spring 42 and is thereby moved to the right when the cam 40 is in its retracted or rear position. To move the cam 40 forwardly and thus move the secondary carrier 22 to the left as viewed in Fig. 1, the cam plate 40 is adjustably connected to a piston rod 43 of a cylinder 44, and, when the cam bar is thus moved forwardly by the cylinder 44, a cam surface 45 thereon engages the roller 39 and moves the secondary carrier to the left to bring the tool against the work.

After the work has been finished the parts are in the position shown in Fig. 1. The cam 40 is then retracted, withdrawing the tool from the work. Hydraulic pressure is then applied to the cylinder 25 to withdraw the primary tool carrier 19 to the rear. To entirely clear the tool and its carrier of the work, the rearward movement of the carrier 19 may be continued to its limit, the roller 34 merely moving to the rear away from the cam plate 29. The spindle being stopped, the work is removed, and a new piece chucked. After the spindle is again started, the cam 29 is retracted and the pressure of the cylinder 25 is reversed causing the tool to move forwardly as far as the cam 29 will permit, then the cam 40 is moved forwardly advancing the tool to the work. Then the cam 29 is advanced causing the tool to move radially toward the periphery of the work— the roller 34 riding along the inclined surface 31 of the cam. At the end of the working stroke the roller 34 rides off the surface 31 and onto the drop 32, and this permits a slight receding movement of the tool so as to relieve the tool from the work and permit it to be withdrawn from the work by the retraction of the cam 40.

It will be seen from the above that the present invention not only positions the tool and the tool carriers at the rear of the lathe leaving the front free and accessible for the operator to mount and remove the work, but also retracts the carriers and tool so far to the rear and entirely clear of the work that when the machining operation is completed the finished work may be removed axially from the chuck and the new work likewise replaced in the chuck without interference.

In the broader aspects of this invention, the cylinders 25, 38 and 44 may be controlled by hand operation at the will of the operator and without regard to a predetermined plan of time or sequence.

However, to obtain high efficiency in time and effort, especially when producing workpieces in quantity, the present invention provides for the automatic sequential operation of the various parts from the beginning of one cycle to the end.

For this purpose, the present invention provides trip switches on the various moving parts so that when a part completes an operation or a phase thereof, the operation of the next part to be operated will be initiated.

Figure 3:
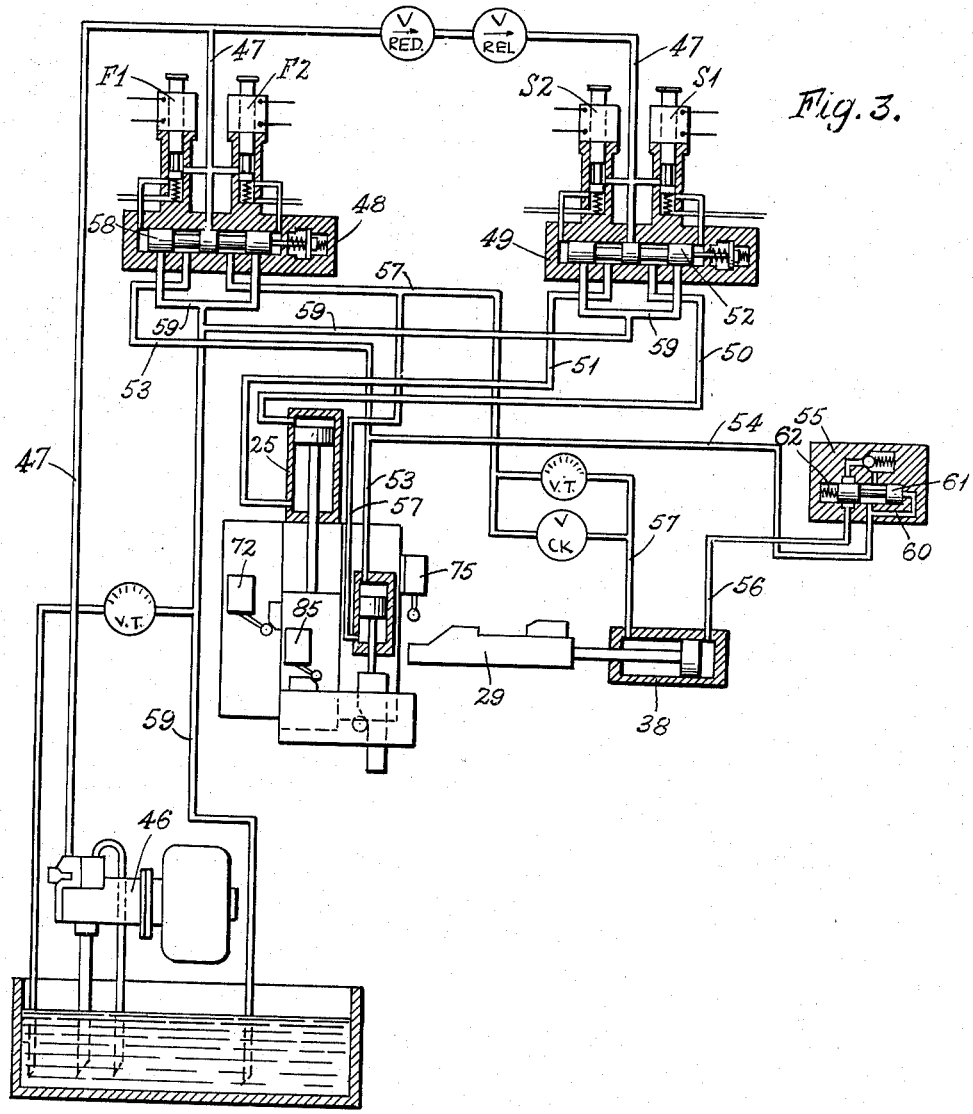
Fig. 3 is a schematic view of the hydraulic system for controlling movement of the parts.

Referring to the hydraulic system diagrammatically illustrated in Fig. 3, a suitable pump 46 produces pressure on pipes 47 leading to the piston valves 48 and 49, the latter controlling pipes 50 and 51 leading to the back and front sides of the cylinder 25 respectively and controlling the front and back movements of the tool carrier 19 through the reciprocation of the valve piston 52. Electromagnetic valves S1 and S2 control the flow of fluid under pressure to opposite sides of the valve piston 52 and cause the movement of the valve to the left or to the right as shown in Fig. 3. When the valve piston is moved to the left, pressure is transmitted through the pipe 50 to the back end of the cylinder 25 to move the tool carrier 19 forwardly, and when it is moved to the right the pressure is applied to the front of the cylinder 25 to move the tool carrier 19 rearwardly.

The piston valve 48 controls the transmission of pressure directly to the back end of the cylinder 44 through a pipe 53 and indirectly through a pipe 54 leading to a sequence valve 55 and a pipe 56 to the right end of the cylinder 38, which causes the slide 20 to move to the left and control the cutting stroke of the carrier 19 through operation of the cam 29. Pressure is applied to the left side of the cylinder 38 through the piston valve 48 and to the front side of the cylinder 44 by piping 57 to withdraw the cam 29 and allow the carrier 19 to move forwardly.

The valve 48 has a valve piston 58 which is moved to the right to connect the pressure pipe 47 to the pipe 53 and is moved to the left to connect the pressure pipe 47 to the pipe 57. To move the valve piston 58 to the right, there is an electromagnetic valve F1, and to move it to the left there is an electromagnetic valve F2.

When the piston valves 52 and 58 are in the intermediate positions shown in Fig. 1, whatever pressure there is in the piping is maintained. However, when the piston valves are in either extreme position connecting the pressure to one of the pairs of pipes, the other of the pair of pipes is connected by piping 59 leading back to the fluid tank.

When pressure is applied to the pipe 53, it is first effective on the cylinder 44, the effort required to move the tool carrier 22 toward the work being comparatively slight. As soon as the piston of the cylinder 44 has reached the limit of its movement, the pressure becomes effective in the pipe 54 and is transmitted through a channel 60 in the sequence valve 55 to the right side of a valve piston 61 therein, thus causing the valve piston to move to the left against the tension of a spring 62 and connect the pressure-containing pipe 54 to the pipe 56 at the right end of the cylinder 38. Thus, as soon as the tool has moved toward the work into cutting position, the cam 29 begins to operate to give the carriage 19 its cutting stroke.

The electromagnetic valves S1, S2 and F1, F2 are controlled by trip switches suitably placed to be engaged by the moving parts of the mechanism and, as will be pointed out below, while the tool carrier is being given its operating or cutting stroke by operation of the cylinder 38, pressure is maintained on the rear of the cylinder 25 through the proper positioning of the valve piston 52.

Figure 4:
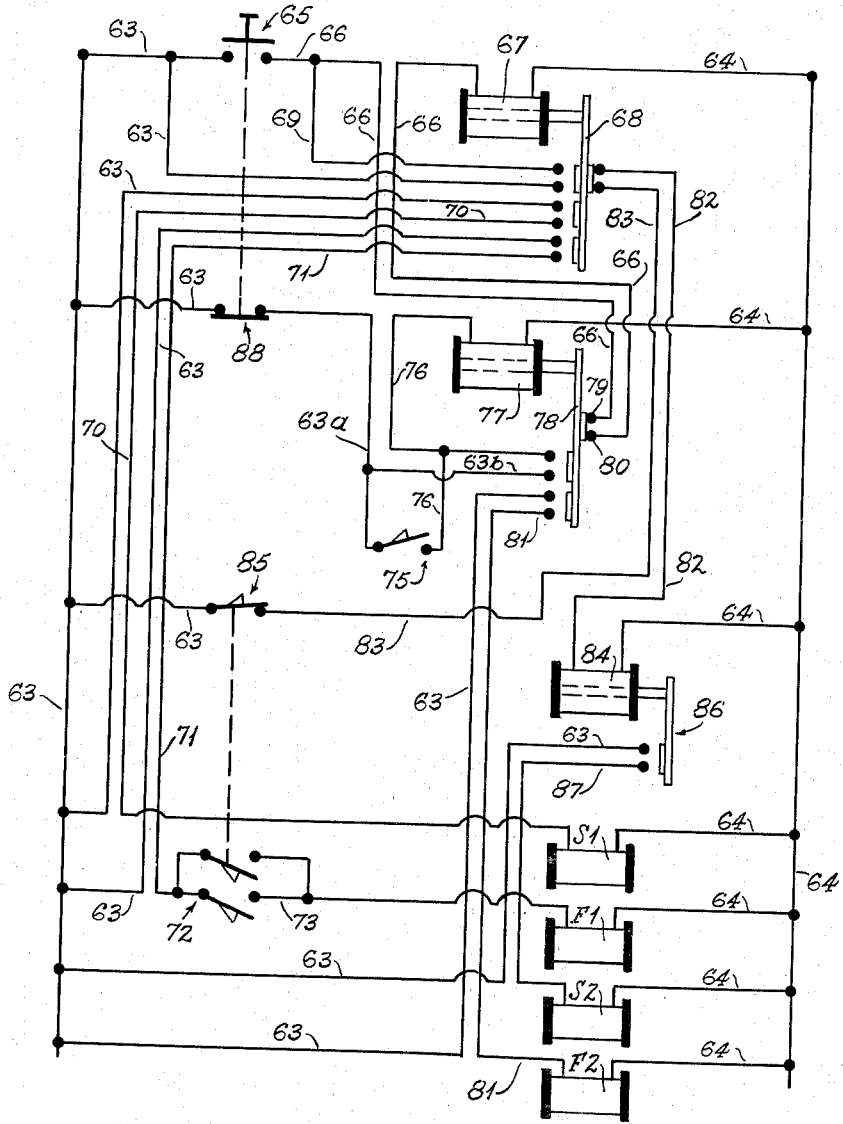
Fig. 4 is a diagram showing the circuits for controlling the electromagnetic valves which in turn control the operation of the parts.

Referring to the wiring diagram, Fig. 4, all the wires permanently connected to one side of the source of current are numbered 63 and all the wires connected to the other side of the source of current are numbered 64.

To start a cycle of operations, a switch button 65 is depressed to connect the wires 63 through wires 66 to a control solenoid 67 permanently connected to a wire 64. This energizes an armature 68 of the solenoid 67 and causes it to close a gap between wires 63 and wires 69 leading back to the wires 66 which thus constitutes a holding circuit and maintains the solenoid 67 operative. At the same time, the armature 68 closes a gap between the wire 63 and a wire 70 leading to the electromagnetic valve S1 which controls the forward movement of the carrier 19 as pointed out above. At the same time, the armature 68 closes a gap between a wire 63 and a wire 71 to a trip switch 72 which is positioned to be controlled by the back and forward movements of the carrier 19. When the carrier 19 reaches the limit of its forward movement, the trip switch 72 closes a gap between the wire 71 and a wire 73 leading to the electromagnetic valve F1 which controls the movement of the carrier 22 to move the tool toward the work, and also controls the working stroke of the carrier 19 through operation of the sequence valve 55. During this time, the solenoid S1 remains operative so that forward pressure is maintained on the carrier as the roller 34 rides up on the cam 29.

When the working stroke is completed and while the slide 19 is held in the position controlled by the cam 29, the trip switch 72 is opened, thus deenergizing the solenoid F1 and permitting the valve piston 58 to take its neutral position shown in Fig. 3. Further movement of the cam 29 operates a trip switch 75 to close the circuit between a wire 63a and a wire 76 connected to a solenoid 77, the other end of which is connected to the wire 64 to energize the solenoid. When the solenoid 77 is energized, its armature 78 is moved to open a gap between contacts 79 and 80 connected to the wires 66 of the hold-in circuit for the solenoid 67, thereby permitting the armature 68 to open the circuit through the wires 70 to the solenoid S1 which controls the forward movement of the carrier 19 and permits the valve piston 52 to move to the neutral position shown in Fig. 3, thereby withdrawing the pressure which tends to move the carrier 19 forwardly. At the same time, the armature 78 closes a gap between the wire 76 leading to the solenoid 77 and an extension 63b of the wire 63a connected to the wire 63 completing a holding circuit for the solenoid 77. At the same time, the armature 78 closes a gap between the wire 63 and a wire 81 leading to the solenoid F2. When the solenoid F2 is operated, the valve piston 58 is moved to the left as viewed in Fig. 3, causing pressure to be applied to the piping 57 which leads to the back side of the cylinder 44 and the left side of the cylinder 38, with the result that the cam 40 is withdrawn permitting the slide 22 to be moved to the right by its return spring and the cam 29 to be moved to the right and free the carrier 19 for rearward movement.

When the solenoid 67 was deenergized coincidental with the operation of the trip switch 75, the armature 68 closed a gap in a circuit including wires 82 and 83, the former leading to a solenoid 84 and the latter leading to a trip switch 85 connected to the wire 63. This caused the armature 86 of the solenoid 84 to close a circuit between the wire 63 and a wire 87 leading to the solenoid valve S2 which causes the valve piston 52 to move to the right in Fig. 3 connecting the pressure line to the pipe 51 leading to the front side of the cylinder 25, and thus moving the carrier 19, carrier 22 and tool to the limit of their rearward movement, but this operation does not occur until the trip switch 85 is closed. This trip switch is positioned to be operated by the carrier 22 when it has completed its returning movement, and thus it is not until the carrier 22 has returned to the position in which the tool is clear of the work that the solenoid S2 operates to cause the return of the carrier 19.

This is the end of the cycle, the parts being held in their inoperative position by hydraulic pressure so long as the wires 63 and 64 are energized, and it is during this time that the spindle is stopped, the finished work is removed, and the new work chucked. In starting the cycle by operation of the button 65, the energizing circuit leading to the solenoid 77 is broken momentarily by a switch bar 88 connected to the button 65 and located between wires 63 and 63a. This permits the armature 78 to return to the position shown in Fig. 4 in which the solenoid 67 is deenergized and permitting the operations to be carried on as first described above in connection with the wiring diagram shown in Fig. 4.

Figure 5:
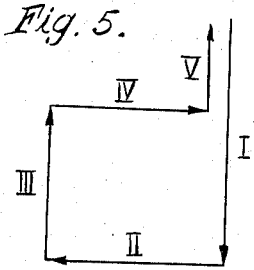
Fig. 5 is a diagrammatic view showing the directions of movements of the tool in its cycle of operations.

Fig. 5 diagrammatically shows the directions which the movements of the tool take in the specific embodiment of this invention herein shown as illustrative thereof. The movement of the tool from its rearmost position forwardly toward the axis of the spindle is shown by line I; the movement of the tool toward the face of the work by line II; the movement of the tool in its working stroke at the end of which there is a slight recession by line III; the movement of the tool away from the face of the work by line IV; and the return of the tool to its most rearward position by line V.

It should be understood that the terms "front" and "rear," and "right" and "left" are relative terms and their meanings depend upon how the mechanism is actually situated on the lathe or viewed. As used herein, however, "front" designates the loading side of the machine and "rear" designates the side away from the loading side. For instance, the carriage 17, carriers 19 and 22, and their supporting structures may be mounted vertically instead of horizontally, and the tool supporting end may be uppermost or lowermost as desired, so long as the tool and its carriers are moved completely clear of the work so that the work may be removed from the front of the machine without interference with the tool and its carriers.

Variations and modifications may be made within the scope of the claims and portions of the improvements may be used without others.

I claim:

In a lathe, a bed; ways on said bed and located on the back side of said lathe; a tool carriage mounted on and adapted adjustably to be fixed to said bed at a predetermined location along said ways; a tool carrier mounted on said carriage for movement along angularly related paths; a piston and cylinder device mounted on said carriage for moving said tool carrier along one of said paths transversely of said ways and throughout its entire movement along said path; another piston and cylinder device mounted on said bed; a feed cam connected to said other piston and cylinder device for limiting the transverse movement of said tool carrier to a predetermined distance; a third piston and cylinder device mounted on said tool carriage; a cam connected to said third piston and cylinder device for causing said tool carrier to move along the path that is angularly related to said one of said paths; solenoid-operated valve means for controlling the flow of pressure fluid to said piston and cylinder devices; and electrical switches responsive to the movement of said piston and cylinder devices for controlling the operation of said solenoid valve means for causing said piston and cylinder devices to be rendered effective in accordance with a preselected sequence.

References Cited in the file of this patent

UNITED STATES PATENTS

| | | |
|---|---|---|
| 1,794,390 | Trobeck | Mar. 3, 1931 |
| 1,807,829 | Bullard | June 2, 1931 |
| 2,008,011 | Foster | July 16, 1935 |
| 2,008,012 | Foster | July 16, 1935 |
| 2,048,107 | Collins | July 21, 1936 |
| 2,118,020 | Curtis | May 17, 1938 |
| 2,146,157 | Salisbury | Feb. 7, 1939 |
| 2,302,854 | Granberg | Nov. 24, 1942 |
| 2,389,746 | Sparks | Nov. 27, 1945 |
| 2,540,323 | Cross | Feb. 6, 1951 |
| 2,557,860 | Bickel | June 19, 1951 |
| 2,566,116 | Chang | Aug. 28, 1951 |
| 2,576,570 | Castelli | Nov. 27, 1951 |
| 2,584,629 | Smith | Feb. 5, 1952 |
| 2,586,183 | Stewart | Feb. 19, 1952 |
| 2,697,373 | Siekmann | Dec. 21, 1954 |
| 2,699,083 | Ovshinsky | Jan. 11, 1955 |
| 2,713,283 | Lomazzo | July 19, 1955 |